July 7. 1931.  J. F. O'CONNOR  1,813,707
RAILWAY DRAFT RIGGING
Filed April 9, 1928  2 Sheets-Sheet 1
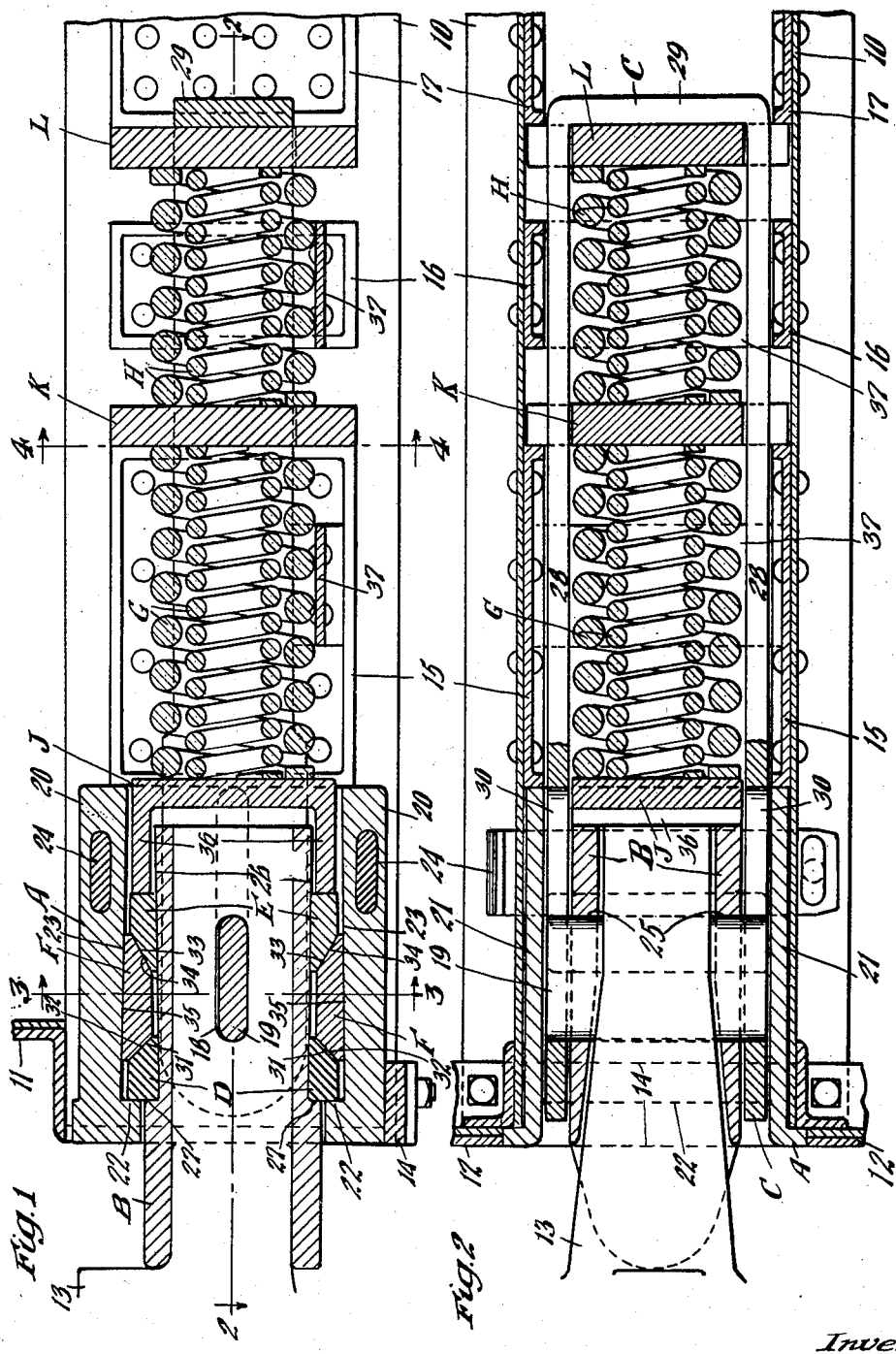
Inventor
John F. O'Connor
By Joseph Harris
His Atty.
Witness
Wm. Geiger

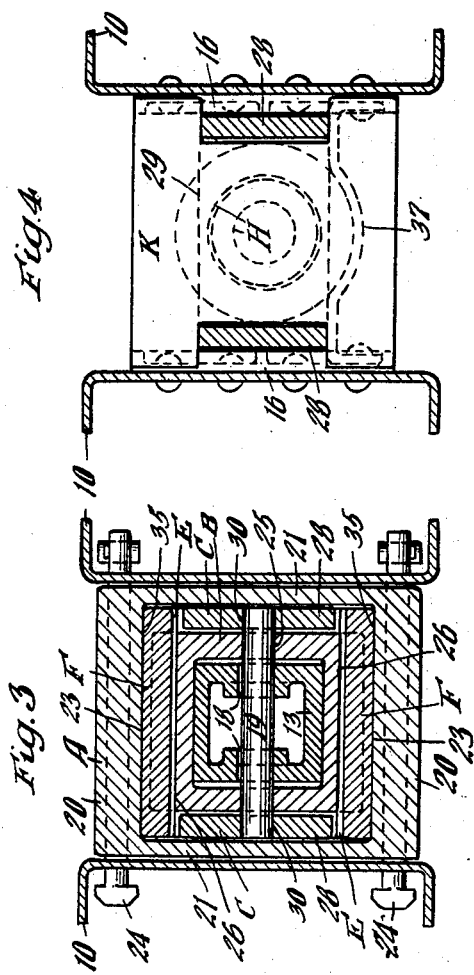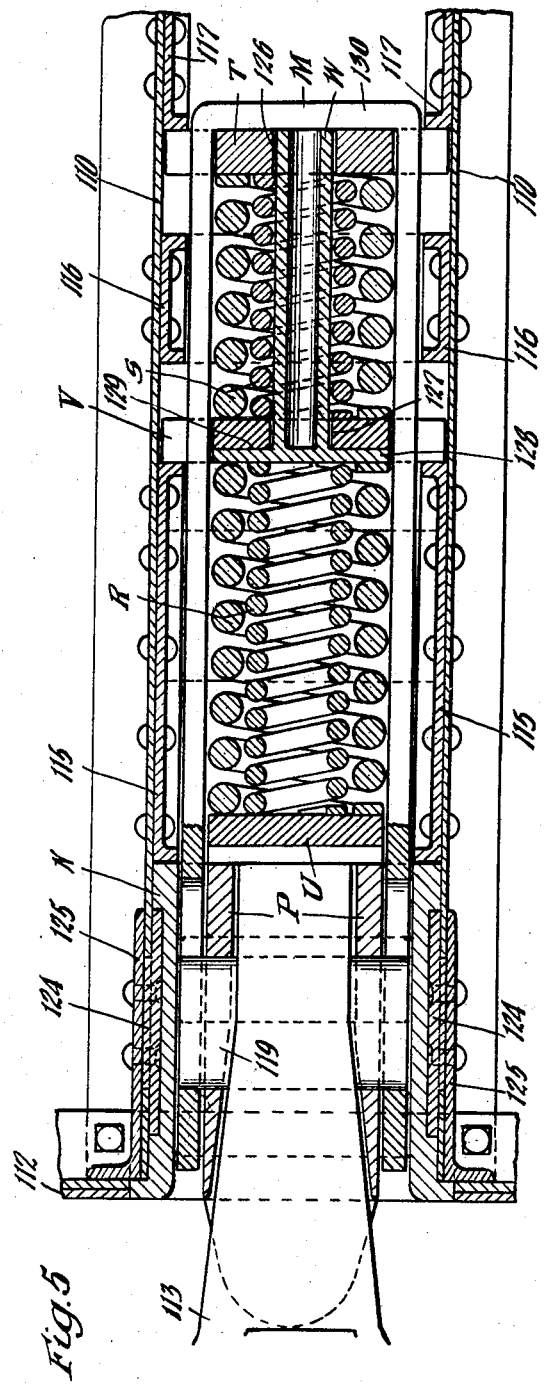

Patented July 7, 1931

1,813,707

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

RAILWAY DRAFT RIGGING

Application filed April 9, 1928. Serial No. 268,562.

This invention relates to improvements in railway draft riggings.

One object of the invention is to provide a railway draft rigging which is adapted for use in connection with standard spaced draft sills of railway cars, having longer stroke in buff than in draft, wherein high shock absorbing capacity is obtained by the employment of friction shock absorbing means actuated in unison with the coupler in both buff and draft.

Another object of the invention is to provide a railway draft rigging of the character indicated, wherein friction shock absorbing means is employed, including a friction element which is movable as a unit with the coupler and cooperates with addition friction means to produce high resistance.

Still another object of the invention is to provide a friction shock absorbing mechanism including co-operating friction elements which are relatively movable, wherein one of the friction elements is movable with the coupler in both buff and draft and differential action is had.

A further object of the invention is to provide a railway draft rigging including a coupler and friction shock absorbing mechanism actuated thereby, wherein the coupler shank carries friction means movable in unison therewith in both buff and draft, and co-operates with friction means including a fixed friction shell and friction wedge blocks, wherein the friction surfaces of the means carried by the coupler shank and the friction surfaces of the shell are disposed at an inclination to each other to provide for differential action.

A more specific object of the invention is to provide a railway draft rigging including a coupler actuated in both buff and draft, a friction sleeve enclosing the coupler shank and fixed thereto, a friction shell fixed to the car underframe structure and enclosing the friction sleeve, friction wedge blocks interposed between the sleeve and shell and having interengaging wedge faces and friction surfaces co-operating with the sleeve and shell, wherein the wedge blocks are forced into wedging engagement by spring resistance means and certain of said wedge blocks are forced inwardly and wedged against the remaining blocks by inward movement of the coupler during buffing action.

Other and further objects of my invention will more clearly appear from the description and claims hereinafter following.

In the drawings forming a part of this specification, Figure 1 is a longitudinal, vertical, sectional view of a portion of a railway car underframe structure, showing my improved railway draft rigging in connection therewith. Figure 2 is a horizontal, longitudinal, sectional view, corresponding substantially to the line 2—2 of Figure 1. Figures 3 and 4 are vertical, transverse, sectional views, corresponding respectively to the lines 3—3 and 4—4 of Figure 1. And Figure 5 is a horizontal, sectional view, similar to Figure 2, illustrating a different embodiment of the invention.

In said drawings, referring first to the embodiment of the invention disclosed in Figures 1 to 4, inclusive, 10—10 indicate the channel-shaped center or draft sills of a railway car underframe. The draft sills 10 are of standard design and are spaced the standard distance apart. The end sill proper of the car structure is designated by 11 and the lower angle end sill is designated by 12. The end sill members 11 and 12 are fixed to the draft sills 10 in any suitable manner. The coupler of the car is designated by 13 and has the shank thereof disposed between the draft sills. A carry iron 14 is suitably secured to the lower flange sections of the draft sills and, as illustrated, is fixed thereto by bolts.

In carrying out my invention, I provide the draft sills with stop castings 15, 16, and 17, the stop castings 16 being disposed intermediate the castings 15 and 17, as most clearly shown in Figure 2. The casting 15 is of greater length than the casting 16 and presents abutment faces at the opposite ends thereof for a purpose hereinafter described. The casting 16 also presents front and rear abutment faces, and the casting 17 presents a front abutment face which acts as one of the rear stop members of the railway draft rigging. As shown, the shank of the coupler 13 is provided with the usual key-receiving slot 18, through which the key 19 extends.

The shock absorbing means of my improved railway draft rigging comprises, broadly, a fixed friction casing or shell A; a friction sleeve B, which is secured to the shank of the coupler; a yoke member C which is anchored to the coupler by means of the key 19; front friction wedge blocks D, rear friction wedge blocks E, and intermediate friction wedge blocks F; spring resistance means comprising a front spring element G and a rear spring element H; and follower members J, K, and L.

The friction shell A is in the form of a relatively heavy rectangular box-like member, having spaced top and bottom walls 20—20 and spaced side walls 21—21. As shown, the top wall is thickened at the forward end thereof, thereby providing an interior limiting shoulder 22 extending transversely of the shell. The bottom wall is also inwardly thickened at the forward end, thus providing an abutment shoulder corresponding to the shoulder 22 and in alignment therewith, the abutment shoulder on the bottom wall being also designated by 22. The top and bottom interior wall members present longitudinally disposed friction surfaces 23—23 which converge inwardly of the mechanism, as most clearly shown in Figure 1. The friction shell is directly supported by the carry iron 14 and is fixed to the draft sills by top and bottom transversely disposed keys 24—24, which extend through openings in the top and bottom walls of the shell and aligned openings in the vertical webs of the draft sills. As will be evident, the friction shell A is thus fixed against longitudinal movement with respect to the car underframe structure. It is also pointed out that the front end section of the shell A forms, in effect, a striking casting which co-operates with the coupler horn to limit the inward movement thereof.

The sleeve B is of substantially rectangular cross section and snugly fits the shank of the coupler 13. As shown, the sleeve B is of substantially the same length as the shank proper of the coupler, having the rear end thereof flush with the butt end of the coupler shank and the front end portion of the top wall thereof abutting the coupler horn. As most clearly shown in Figure 2, the side walls of the sleeve B are cut away to correspond to the contour of the coupler shank, which, as disclosed, tapers rearwardly. A slight amount of play is permitted between the coupler shank and the side walls of the sleeve B, so as to allow for the required lateral movement of the coupler with respect to the draft rigging proper. The sleeve B is fixed with respect to the coupler by means of the key 19, which has the opposite ends thereof extending through openings 25—25 in the side walls of the sleeve. As shown, the key tightly fits the openings 25 so that there is no relative movement between the sleeve and the coupler. The top and bottom walls of the sleeve have the rear section thereof cut away, as most clearly shown in Figure 1, thereby providing longitudinally disposed top and bottom friction surfaces 26—26 which are offset inwardly with respect to the top and bottom surfaces of the forward portion of the sleeve B. The cut away portions of the top and bottom wall sections of the sleeve also provide transverse abutment shoulders 27—27 at the front ends of the friction surfaces for a purpose hereinafter pointed out. The friction surfaces 26—26 preferably diverge inwardly of the mechanism, as shown in Figure 1, for a purpose hereinafter described.

The yoke member C is horizontally disposed and is of U-shape, having longitudinally disposed side members 28—28 and a transverse inner end member 29. The coupler is connected to the yoke by means of the key 19, which works in slots 30—30 provided in the side members 28 of the yoke. As shown in Figures 1 and 2, the slots 30 are of such a length as to permit considerable inward movement of the coupler and sleeve B with respect to the yoke before the key 19 comes in engagement with the inner end walls of the slots.

The front end abutment faces of the stop castings 15 engage the inner end of the friction shell and serve as an additional means for holding the shell fixed, especially when the railway draft rigging is subjected to a buffing action. Further means is also provided for opposing inward movement of the friction shell A, comprising laterally outwardly extending flange sections at the forward end portions of the side walls which overhang the vertical web sections of the draft sills 10.

As shown, the friction wedge blocks D, E, and F are arranged in two sets above and below the sleeve B and are interposed between the sleeve and the interior friction surfaces on the top and bottom walls of the shell A. Each set of friction wedge blocks are so arranged that two blocks of the set have frictional engagement with the corresponding friction surface of the sleeve B and the remaining block has frictional engagement with the corresponding friction surface of the shell A. The friction wedge blocks D and E of each set are disposed respectively in front and in back of the friction wedge block F. The outer friction wedge block D of each set has a flat front end face which normally abuts the corresponding limiting stop face 22 of the casing A and the abutment face 27 on the corresponding wall of the sleeve B. On the inner side, the wedge block D is provided with a flat friction surface which engages the friction surface 26 at the same side of the sleeve B. At the inner end, the block D is provided with a wedge face 31 which co-operates with a wedge face 32 at the forward end of the friction wedge block F. The rear or inner friction block E of each set is provided with a flat rear end face which co-operates directly with the follower J. On the inner side, the block E is provided with a longitudinally disposed friction surface which co-operates with the corresponding friction surface 26 of the sleeve B. At the forward end, the wedge block E is provided with a wedge face 33 which co-operates with the correspondingly inclined wedge face 34 at the inner end of the friction wedge block F of said set. As disclosed in Figure 1, the co-operating wedge faces 33 and 34 are disposed at a relatively keener wedge acting angle than the co-operating wedge faces 31 and 32. The wedge friction block F has an outer friction surface 35 which cooperates with the corresponding interior friction surface 23 of the shell A.

The spring resistance elements G and H are disposed within the yoke C, each element comprising an inner relatively light coil and an outer heavier coil. The spring resistance H, as shown, is shorter than the spring resistance G and has the rear end thereof bearing on the follower L, which is interposed between the same and the end section 29 of the yoke C. As shown, the follower L is of substantially H-shape, having top and bottom arms which overhang the side members of the yoke and co-operate with the rear stop shoulders of the stop castings 17. The follower K, which is of similar design to the follower L, is interposed between the spring resistance elements G and H, and normally bears directly on the rear stop shoulders of the stop castings 15. The front end of the spring resistance G bears directly on the spring follower J, which is in the form of a U-shaped member having forwardly extending spaced top and bottom arms 36—36, which embrace the rear end portion of the sleeve B. As shown, the arms 36 are spaced apart such a distance as to permit a certain amount of clearance between the sleeve B and the same, so that no resistance is offered to the movement of the follower J. The front ends of the arms 36 bear directly on the inner ends of the wedge friction blocks E of the top and bottom sets. When the mechanism is assembled, the spring resistance elements G and H are preferably placed under initial compression so that the wedge blocks E will be urged forwardly.

The yoke and the springs carried therewithin are supported by saddle plate members 37—37, which are secured to the respective draft sills. The saddle plate members 37, as shown in Figure 4, have horizontal side sections which directly support the side members 28 of the yoke and an intermediate, depressed, curved section which serves to support the outer coil of the corresponding spring resistance element.

The normal position of the parts of the mechanism is shown in Figures 1 and 2, wherein the coupler key 19 is in engagement with the front end walls of the slots 30 of the side members of the yoke, the wedge blocks D are in abutment with the shoulders 22 of the friction shell A and the shoulders 27 of the sleeve B, the follower K is in engagement with the stop shoulders at the inner ends of the castings 15, and the follower L is in engagement with the stop shoulders of the castings 17. Upon reference to Figure 2, it will be seen that inward movement of the coupler and the sleeve B, with respect to the yoke, is permitted for the full length of travel of the key 19 in the slots 30, and inward movement of the follower K is permitted to the extent of the spacing between the follower and the front stop shoulders of the castings 16. Forward movement of the follower L is permitted to the extent of the spacing between the follower and the rear stop shoulders of the castings 16.

The operation of my improved railway draft rigging, as illustrated in the embodiment of the invention disclosed in Figures 1 to 4, inclusive, is as follows, assuming a pulling or draft action is being applied to the coupler 13. Upon forward movement of the coupler 13, the yoke C will be pulled forwardly in unison therewith through the medium of the connecting key 19, thereby compressing the spring resistance H between the follower L and the follower K. Inasmuch as the sleeve B is fixedly secured to the coupler shank, the same is carried outwardly in unison therewith. Friction is thus created between the friction surfaces of the sleeve B and the friction wedge blocks D and E. The friction wedge blocks D and E are held in tight frictional contact with the sleeve B by the expansive action of the spring resistance G, which, as hereinbefore pointed out, is under initial compression.

Through the expansive action of the spring G, the wedge blocks E are wedged against the blocks F and the latter against the blocks D which are prevented from outward movement by engagement with the stop shoulders 22 on the shell A. The friction blocks F are thus forced laterally outwardly into tight friction contact with the friction surfaces of the shell A. Due to the inwardly diverging relation of the top and bottom friction surfaces 26 of the sleeve B, a differential action will be effected, thereby causing an elongation of each set of friction wedge elements, forcing the rear wedge elements E inwardly of the mechanism and compressing the spring resistance G against the follower K. Due to the differential action produced, the frictional resistance offered will be greatly augmented. The described action will continue until forward movement of the yoke C is limited by engagement of the follower L with the rear stop shoulders of the castings 16. This movement is preferably limited to correspond to the usual movement permitted in draft in standard railway practice. The parts of the railway draft rigging will be restored to the normal position by the expansive action of the spring resistance elements G and H when the actuating force is reduced in release.

The operation of the improved railway draft rigging during a buffing or inward movement of the coupler is as follows: The sleeve B being fixed to the coupler shank is forced to move inwardly in unison therewith, thereby forcing the wedge blocks D inwardly also, through the medium of the abutment shoulders 27 on the sleeve. The inward movement of the wedge blocks D will effect a wedging action between these blocks and the blocks F, forcing the latter rearwardly also and outwardly against the friction surfaces of the shell A. Due to the inward movement of the blocks F, the rear wedge blocks E will be forced laterally inwardly against the friction surfaces of the sleeve B and also rearwardly of the mechanism, their rearward movement being resisted by the spring element G through the interposed spring follower J. Inasmuch as the follower K is normally spaced from the stop shoulders at the forward ends of the castings 16, this follower will be forced rearwardly by the spring G compressing the spring resistance H against the follower L which is held stationary by the stop lugs of the castings 17. Both springs will thus be compressed during the inward movement of the coupler and the sleeve B. As the sleeve B is forced inwardly, the friction wedge blocks F will slide on the friction surfaces 23 of the shell A, and due to the inwardly converging relation of these friction surfaces a differential action will be set up, thereby elongating the two sets of friction wedge members and effecting additional compression of the spring resistance elements G and H. Rearward movement of the follower K will be limited by engagement with the front stop shoulders of the stop castings 16. In case the follower K engages the stop castings 16 before the coupler horn engages the front end of the shell A, the front spring resistance G only will be compressed during the last part of the buffing action. Inward movement of the coupler and sleeve B is positively limited by engagement of the coupler horn with the front end of the shell A.

Referring to the embodiment of the invention illustrated in Figure 5, the improved railway draft rigging as shown therein, comprises the center or draft sills 110—110, the lower angle end sills 112, coupler 113, stop castings 115, 116, and 117, coupler key 119, and yoke member M, which are identical with the corresponding parts indicated by 10, 12, 13, 15, 16, 17, and C, in Figures 1 to 4, inclusive.

The improved mechanism illustrated in Figure 5 also includes a friction shell N, which is fixed to the draft sills 110, a sleeve P secured to the coupler shank of the coupler 113, and front and rear spring elements R and S disposed within the yoke.

The arrangement of the sleeve P is identical with that of the sleeve B, shown in Figures 1 to 4, inclusive, and friction wedge blocks similar to the blocks D, E and F are interposed between friction surfaces disposed at the top and bottom of the sleeve B and interior friction surfaces on the top and bottom walls of the friction shell N. The friction shell N is secured to the draft sills by means of retaining plates 124—124 seated in sockets in the side walls of the friction shell and riveted to the vertical webs of the draft sills 110. In order to reinforce the structure, plates 125—125 are disposed on the outer sides of the webs of the draft sills, and the rivets which secure the plates 124 extend through the plates 125. Movement of the shell N inwardly of the mechanism is also opposed by the stop castings 115 which have front end abutment faces engaging the inner ends of the side walls of the friction shell. The side walls also have their front ends turned laterally outwardly to provide flanges which abut the front end portions of the vertical webs of the draft sills 110. The spring resistance elements R and S are disposed within the yoke and the rear end of the spring resistance S bears on a spring follower T which is identical with the spring follower L of the form of invention hereinbefore described, and bears on the stop shoulders at the front ends of the castings 117. A spring follower U, identical with the spring follower J, is interposed between the front end of the spring resistance R and the innermost wedge blocks of the top and bottom sets. A spring follower V is interposed between the spring resistance elements R and S, and normally bears on the rear stop shoulders of the stop castings 115.

The construction shown in Figure 5 differs mainly from the construction hereinbefore described, in that means is employed for compressing the springs in tandem when a draft action is being applied to the coupler.

In order to produce this tandem action, I provide a pressure-transmitting member W, which has a main body portion of the tubular form extending through the inner coil of the spring resistance S and through openings 126 and 127 provided in the followers T and V, respectively. At the forward end, the pressure-transmitting member W is provided with a substantially circular disc-like head 128, which is normally seated in a recess 129 in the front face of the follower V. The head 128 bears directly on the inner end of the spring resistance R, and the rear end of the tubular section of the pressure-transmitting member W bears on the transverse end section 130 of the yoke M.

The operation of the embodiment of the invention illustrated in Figure 5 is substantially the same as that of the embodiment hereinbefore described, during a buffing action. It will be evident that the springs R and S are simultaneously compressed during buff, due to the free movement of the follower V between the stop castings 115 and 116.

During a draft action, the yoke M will be pulled forwardly in a manner similar to the operation of the yoke C, hereinbefore described, thereby causing forward movement of the follower T. The spring S will thus be compressed between the follower T and the follower V. Inasmuch as the end section 130 of the yoke M bears directly on the inner end of the pressure-transmitting tubular member W, the latter will be forced forwardly in unison with the yoke M, thereby compressing the spring resistance R between the head 128 of the pressure-transmitting member and the follower U, thus exerting additional pressure on the friction wedge members of the top and bottom sets. It will be evident that the springs R and S of the device are thus compressed in tandem during a draft action, and are compressed simultaneously in the manner of a single spring in buff.

While I have herein shown and described what I consider the preferred manner of carrying out my invention, the same is merely illustrative and I contemplate all changes and modifications which come within the scope of the claims appended hereto.

I claim:

1. In a railway draft rigging, the combination with friction means fixed to the car underframe structure and extending lengthwise of the rigging; of a coupler actuated in buff and draft; friction means movable lengthwise of the rigging in unison with the coupler; wedge friction means interposed between said fixed and movable means, said wedge friction means including a plurality of wedge blocks having wedging engagement with each other and frictional engagement with the fixed and movable friction means; and spring resistance means opposing movement of said wedge friction means.

2. In a railway draft rigging, the combination with a friction element fixed to the car and having a friction surface extending lengthwise of the rigging; of a coupler movable in buff and draft; friction means movable lengthwise of the rigging in unison with the coupler shank in both buff and draft; wedge friction means interposed between said fixed friction element and the movable friction means, said wedge friction means comprising co-operating wedge friction elements having wedging engagement with each other and frictional engagement with the fixed friction element and movable friction means, one of said wedge friction elements being forced inwardly in unison with the coupler in buff; and spring resistance means opposing inward movement of said wedge friction means.

3. In a railway draft rigging, the combination with a fixed friction element; of a coupler movable in both buff and draft; friction means movable in unison with said coupler in both buff and draft; wedge friction means interposed between said fixed friction element and friction means, said wedge friction means including a plurality of co-operating wedge elements having frictional engagement with the friction element and movable friction means and wedging engagement with each other; spring means opposing inward movement of said wedge friction means; fixed abutment means limiting outward movement of said wedge friction means; and means actuated in buff for forcing said wedge friction means inwardly against the spring resistance.

4. In a friction shock absorbing mechanism, the combination with a fixed friction shell held against movement in both buff and draft, said shell having interior friction surfaces extending lengthwise of the mechanism; of friction means movable inwardly of the shell in buff and outwardly of the shell in draft; front, rear and intermediate wedge friction elements having co-operating wedge faces, certain of said elements having frictional engagement with the shell friction surfaces and movable lengthwise thereof and the remaining elements having frictional engagement with said movable friction means; means opposing outward movement of said front wedge elements; and spring resistance means opposing inward movement of the rear wedge elements, said front wedge elements being actuated and moved inwardly upon inward movement of the movable friction means.

5. In a friction shock absorbing mechanism, the combination with a fixed friction member held against movement in both buff and draft; of a friction member movable inwardly of the mechanism during buff and outwardly of the mechanism during draft; front, rear and intermediate wedge blocks interposed between said fixed and movable friction members; means opposing outward movement of the front wedge blocks, said front wedge block being forced inwardly in unison with the movable friction member; and spring resistance means opposing inward movement of the rear wedge block.

6. In a railway draft rigging, the combination with friction means fixed to the car underframe structure against movement in both buff and draft; of a coupler actuated in buff and draft; friction means movable in unison with the coupler shank, said last named and first named friction means having opposed friction surfaces inclined with reference to each other; wedge friction means, including a plurality of wedge elements having wedging engagement with the other, interposed between the opposed friction surfaces of the fixed and movable friction means; and spring resistance means opposing movement of said wedge friction means.

7. In a railway draft rigging, the combination with friction means fixed to the car underframe structure and held against movement in both buff and draft; of a coupler actuated in buff and draft; friction means movable in unison with the coupler shank, in both buff and draft, said last named and first named friction means having opposed friction surfaces converging inwardly of the mechanism; wedge friction means interposed between the opposed friction surfaces of the fixed and movable friction means; and spring resistance means opposing movement of said wedge friction means.

8. In a railway shock absorbing mechanism, the combination with a fixed friction member; of a movable friction member, said members having opposed friction surfaces angularly disposed with reference to each other; front, rear and intermediate wedge blocks interposed between said friction surfaces of the fixed and movable friction members; means opposing outward movement of the front friction wedge block, said front wedge block being forced inwardly in unison with the movable friction member; and spring means opposing inward movement of the rear wedge block.

9. In a friction shock absorbing mechanism, the combination with a fixed friction member held against movement in both buff and draft; of a friction member movable inwardly of the mechanism in buff and outwardly thereof in draft, said members having opposed friction surfaces converging inwardly of the mechanism; wedge friction means interposed between said converging friction surfaces, said wedge friction means including a front wedge block; means opposing outward movement of said front wedge block, said front wedge block being forced inwardly in unison with the movable friction member; and spring means opposing inward movement of said wedge friction means.

10. In a railway draft rigging, the combination with a fixed friction shell mounted on the car structure; of a coupler having the shank thereof movable within said shell, said shank presenting longitudinally disposed friction surfaces; wedge friction means including co-operating elements having wedging engagement with each other, interposed between said friction surfaces and the fixed friction shell and having frictional engagement with the latter; abutment means on the coupler shank co-operating with said wedge means for forcing the same inwardly of the mechanism; stop means limiting outward movement of the wedge means; and a spring resistance opposing inward movement of the wedge means, including means for yieldingly resisting outward movement of the coupler.

11. In a railway draft rigging, the combination with a friction shell fixed to the draft sills, said shell having top and bottom friction surfaces; of a coupler movable longitudinally of the friction shell and having the shank thereof disposed within the shell; a sleeve fixed to the coupler shank and presenting top and bottom friction surfaces opposed to the friction surfaces of the shell; wedge friction blocks interposed between the friction surfaces of the sleeve and shell; stop means on the shell for limiting outward movement of the wedge members; abutment means on the sleeve co-operating with the wedge members for forcing the same inwardly of the mechanism during a buffing action; a yoke having a lost motion connection with the coupler shank; spring means comprising front and rear spring elements disposed within the yoke; a follower interposed between said front and rear spring elements and co-operating with stop means on the draft sills; a rear follower disposed within the yoke and co-operating with said rear spring element; and a front follower interposed between said front spring resistance and the friction wedge members.

12. In a friction shock absorbing mechanism, the combination with a fixed friction member; of a movable friction member slidable inwardly of the mechanism in buff and outwardly thereof in draft; wedge friction means including a friction wedge member and a wedge block, said wedge member having a longitudinally disposed friction surface cooperating with the fixed friction member, and said wedge block having wedging engagement with the friction wedge member and friction engagement with the movable friction member; spring resistance means opposing movement of the wedge block and wedge member inwardly of the mechanism; and fixed stop means opposing outward movement of said blocks.

In witness that I claim the foregoing I have hereunto subscribed my name this 6th day of April, 1928.

JOHN F. O'CONNOR.